United States Patent
Matsuzawa (10) Patent No.: US 8,736,681 B2
(45) Date of Patent: May 27, 2014

(54) INFORMATION PROCESSING DEVICE, MOVING IMAGE CUTTING METHOD, AND MOVING IMAGE CUTTING PROGRAM

(75) Inventor: Daisuke Matsuzawa, Tokyo (JP)

(73) Assignee: Sony Corporation (JP)

( * ) Notice: Subject to any disclaimer, the term of this patent is extended or adjusted under 35 U.S.C. 154(b) by 154 days.

(21) Appl. No.: 13/133,494

(22) PCT Filed: Dec. 24, 2009

(86) PCT No.: PCT/JP2009/071462
§ 371 (c)(1),
(2), (4) Date: Jun. 8, 2011

(87) PCT Pub. No.: WO2010/074156
PCT Pub. Date: Jul. 1, 2010

(65) Prior Publication Data
US 2011/0242357 A1 Oct. 6, 2011

(30) Foreign Application Priority Data
Dec. 25, 2008 (JP) .................................. 2008-330884

(51) Int. Cl.
*H04N 7/18* (2006.01)
*H04N 5/228* (2006.01)

(52) U.S. Cl.
USPC ....................................... 348/157; 348/222.1

(58) Field of Classification Search
None
See application file for complete search history.

(56) References Cited

U.S. PATENT DOCUMENTS

| | | | |
|---|---|---|---|
| 6,763,069 B1 * | 7/2004 | Divakaran et al. | 375/240.08 |
| 2003/0126604 A1 | 7/2003 | Suh | |
| 2003/0177503 A1 * | 9/2003 | Sull et al. | 725/112 |
| 2004/0088289 A1 * | 5/2004 | Xu et al. | 707/3 |
| 2006/0059120 A1 * | 3/2006 | Xiong et al. | 707/3 |
| 2007/0120986 A1 | 5/2007 | Nunomaki | |
| 2007/0146549 A1 * | 6/2007 | Suh | 348/700 |
| 2009/0103889 A1 | 4/2009 | Stone | |

FOREIGN PATENT DOCUMENTS

| | | | |
|---|---|---|---|
| GB | 2447053 | * | 9/2008 |
| JP | 2003199060 A | | 7/2003 |
| JP | 2003283967 A | | 10/2003 |
| JP | 2005026837 A | | 1/2005 |
| JP | 2007335984 A | | 12/2007 |
| JP | 2008211796 A | | 9/2008 |

OTHER PUBLICATIONS

Chong-Wah Ngo et al: "Motion-based Video 1-6 Representation for Scene Change Detection", International Journal of Computer Vision, vol. 50, No. 2, Jan. 1, 2002, pp. 127-142, XP009146766.
European Search Report from EP Application No. 09834954, dated Apr. 10, 2014.

* cited by examiner

*Primary Examiner* — Albert Cutler
(74) *Attorney, Agent, or Firm* — Lerner, David, Littenberg, Krumholz & Mentlik, LLP (57) ABSTRACT

The creation of a digest video is facilitated, and the editing efficiency is improved. An information processing device is provided with a moving image acquiring unit for acquiring a moving image during imaging, and an event acquiring unit for acquiring event data that is information indicating a scene of each frame of the moving image acquired by the moving image acquiring unit. If the event data acquired by the event acquiring unit satisfies a predetermined condition, a cut signal is generated, the moving image is cut in a predetermined range on the basis of the cut signal, and the cut moving image is stored in a nonvolatile storage medium.

9 Claims, 5 Drawing Sheets

INFORMATION PROCESSING DEVICE, MOVING IMAGE CUTTING METHOD, AND MOVING IMAGE CUTTING PROGRAM

CROSS-REFERENCES TO RELATED APPLICATIONS

The present application is a national phase entry under 35 U.S.C. §371 of International Application No. PCT/JP2009/071462 filed Dec. 24, 2009, published on Jul. 1, 2010 as WO 2010/074156 A1, which claims priority from Japanese Patent Application No. JP 2008-330884 filed in the Japanese Patent Office on Dec. 25, 2008.

TECHNICAL FIELD

The present invention relates to an information processing device, a moving image cutting method, and a moving image cutting program, which generate a moving image file by cutting a moving image during imaging in an appropriate position.

BACKGROUND ART

In live broadcasting of a sports match, a highlight video is broadcast in the middle. For example, in live broadcasting of a soccer match, a highlight video featuring a shot scene, a goal scene, and the like of the first half is broadcast during halftime. In order to broadcast the highlight video during halftime, it is necessary to create the highlight video by editing a moving image captured up to half-time, which is a short time from the start of the soccer match to half-time.

At present, there is equipment that performs editing simultaneously with imaging, but the equipment is significantly expensive. A mechanism for cheaply and simply implementing the equipment is absent.

In order to cheaply perform editing substantially simultaneously with imaging, a created moving image file is edited to create a highlight video while the moving image file is first created by appropriately cutting a captured moving image in a predetermined length.

A moving image of live broadcasting is input to a personal computer (hereinafter, referred to as "PC") in real time, a frame indicating a cut point is set, and a moving image file is generated by cutting a moving image between two cut points adjacent in time. A highlight video is created by editing each sequentially generated moving image file. To increase the efficiency of editing, it is preferable that a cut point be a frame of a point in time when a notable scene such as a shot scene or a goal scene has ended. A special person decides the cut point by his/her own determination using the PC.

In the following Patent Literature 1, the technology of detecting the turn of a video scene, for example, a frame of a point in time when broadcasting from a certain camera has been switched to another camera as a cut point has been proposed.

As disclosed in the following Patent Literature 2 and Patent Literature 3, it is general to record an event during a match as event data in order to perform analysis of the match or the like later. In the case of soccer, the event data includes, for example, information of specific action (a pass, a shot, or the like), a time when a predetermined action has been taken, a person taking a predetermined action, or the like.

CITATION LIST

Patent Literature

Patent Literature 1: Japanese Patent Application Laid-Open No. 2007-335984

Patent Literature 2: Japanese Patent Application Laid-Open No. 2003-199060

Patent Literature 3: Japanese Patent Application Laid-Open No. 2005-26837

SUMMARY OF INVENTION

Technical Problem

Incidentally, in the technology disclosed in Patent Literature 1, it is possible to detect the frame of the turn of the video scene as the cut point, but there is a problem in that the frame of the point in time when the above-described notable scene has ended may not be detected as the cut point.

When a person decides the cut point, since it is necessary to hire a person only to decide the cut point, there is a problem in that a cost is thus necessary even when expensive equipment for editing simultaneously with imaging is not used.

The present invention is made in view of the above-mentioned issue, and aims to provide an information processing device, a moving image cutting method, and a moving image cutting program, which cut a moving image during imaging in a position suitable to create a highlight video and generate a moving image file from the cut moving image.

Solution to Problem

To solve the above-described problem, the present invention includes a moving image acquiring unit for acquiring a moving image during imaging and an event acquiring unit for acquiring event data that is information indicating a scene of each frame of the moving image acquired by the moving image acquiring unit. Further, the present invention includes a cut signal generating unit for generating a cut signal if the event data acquired by the event acquiring unit satisfies a predetermined condition. The present invention includes a moving image cutting unit for cutting the moving image in a predetermined range on the basis of the cut signal and a storage unit for storing the moving image cut by the moving image cutting unit.

According to the above-described configuration, event data recorded during a sports match is used, so that a position where a moving image is cut during imaging can be decided. Thereby, it is possible to sequentially cut the moving image in an appropriate position while capturing the moving image.

Advantageous Effects of Invention

According to the present invention, it is possible to easily create a digest video by editing each cut video and also improve the efficiency of editing.

REFERENCE SIGNS LIST

101: Image processing device
102: Image capturing device
103: User
202: Moving image capturing unit
203: Reproduction controlling unit
204: Display unit
205: Operation unit
206: Control unit
207: Event data file generating unit
208: Nonvolatile storage unit
209: Cut signal generating unit
210: Moving image cutting unit
211: Event data file
212: Moving image file

DESCRIPTION OF EMBODIMENTS

Hereinafter, the best modes (hereinafter, referred to as "embodiments") for carrying out the invention will be described in the following order. Since the embodiments described below are preferred specific examples of the present invention, various preferred technical restrictions are imposed on the embodiments. However, the scope of the present invention is not limited to the embodiments unless specified in the following description. For example, numerical conditions of parameters described in the following description are only preferred examples and schematic dimensions, shapes, and arrangement relationships are shown in the drawings used in the description.

1. Embodiment (1) Overview
(2) Configuration of Image Processing Device
(3) Operation of Image Processing Device
(4) Correspondence Relationship of Hardware 1. Embodiment

[Overview]

Figure 1:
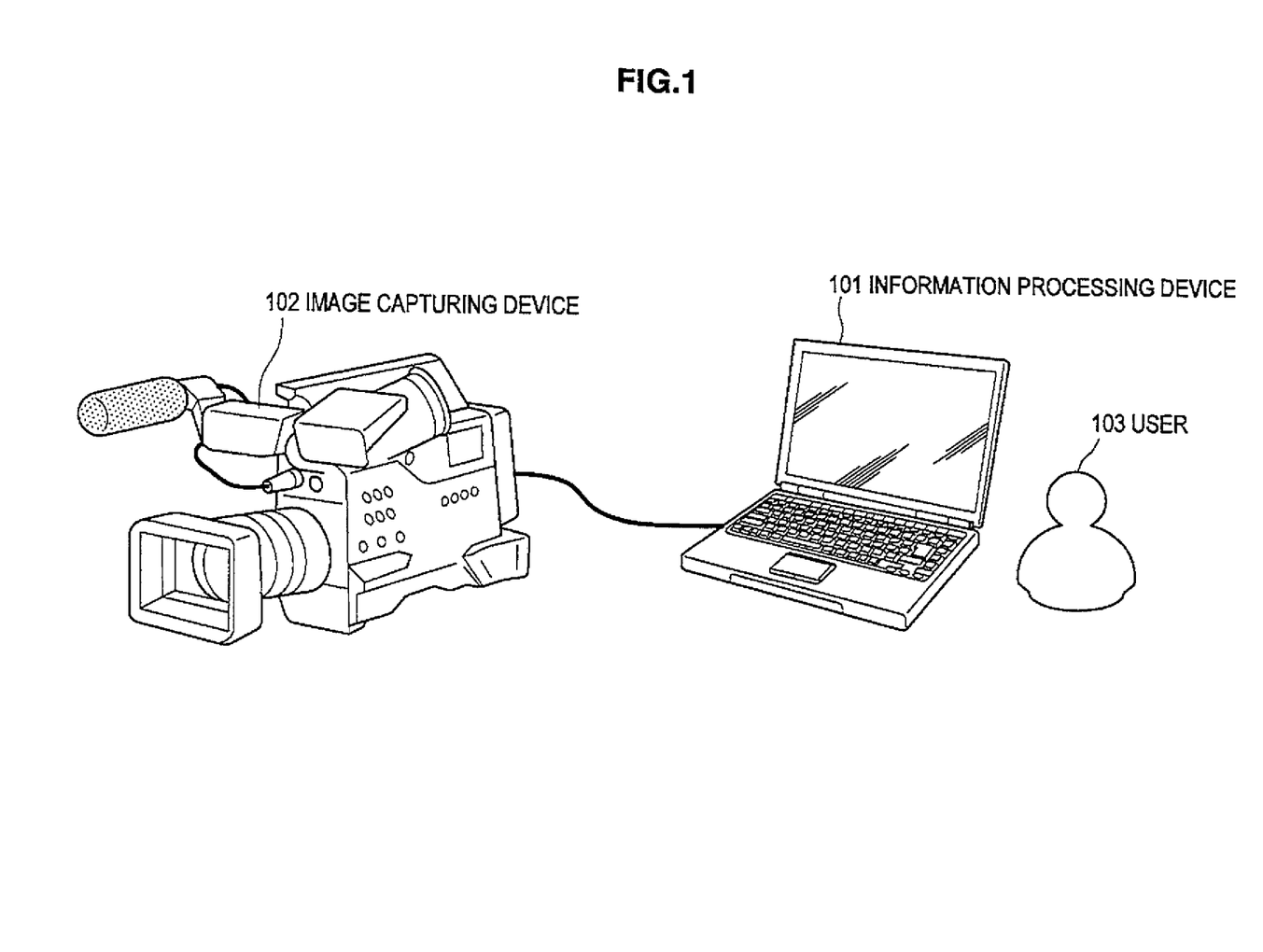
FIG. 1 is an illustrative diagram showing an image processing device and an image capturing device according to an embodiment of the present invention.
Figure 2:
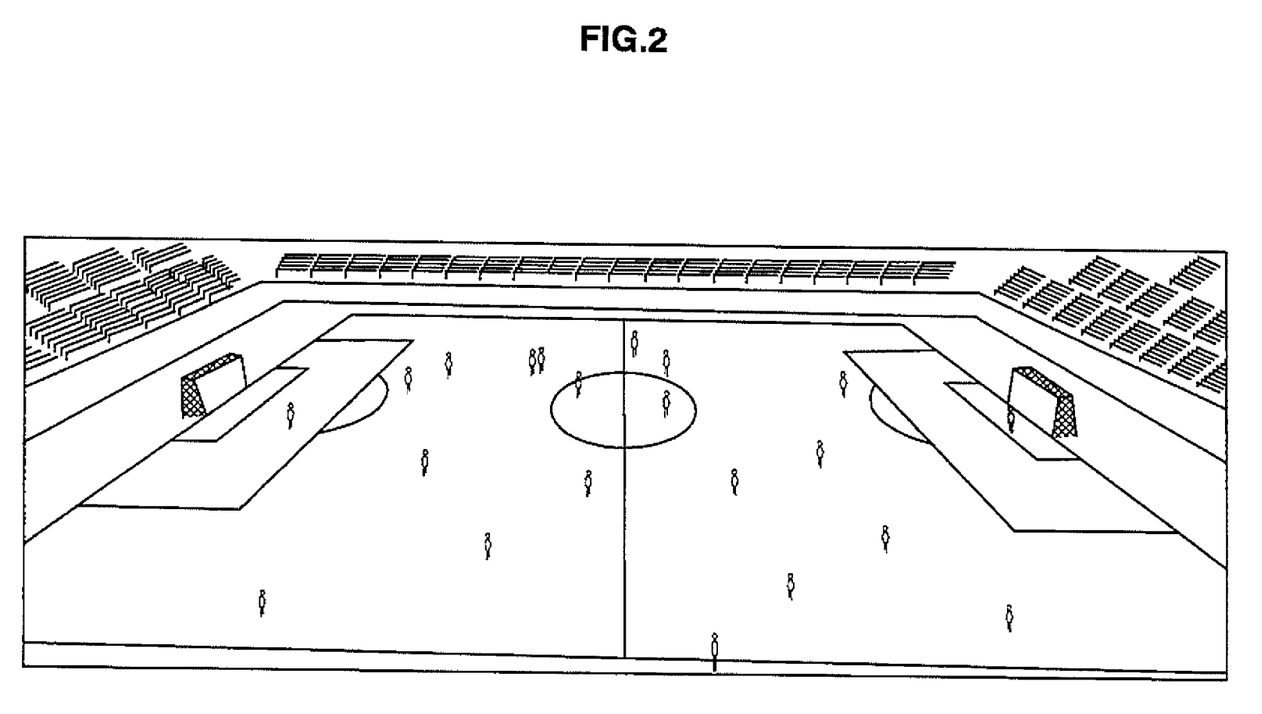
FIG. 2 is a diagram showing an imaging target of the image capturing device.

First, an overview of an information processing device according to the embodiment will be described with reference to FIGS. 1 and 2. FIG. 1 shows an image capturing device 102 and an information processing device 101 connected to the image capturing device 102 by a predetermined connection means.

The image capturing device 102 captures a moving image. In this example, the image capturing device 102 image captures a soccer match as shown in FIG. 2.

For example, a connection cable such as a USB or IEEE 1394 cable, or a wireless communication means such as Bluetooth (registered trademark) or a wireless LAN (WLAN) is used as the connection means that connects the information processing device 101 and the image capturing device 102. Here, USB refers to a universal serial bus, and WLAN refers to a wireless local area network. Of course, other connection means may also be used.

The information processing device 101 acquires the moving image captured by the image capturing device 102 via the above-described connection means, and displays the captured moving image. The information processing device 101 generates/stores a moving image file by cutting the moving image on the basis of an instruction of a user 103.

[Configuration of Information Processing Device 101]

Next, the configuration of the information processing device 101 will be described with reference to FIG. 3.

Figure 3:
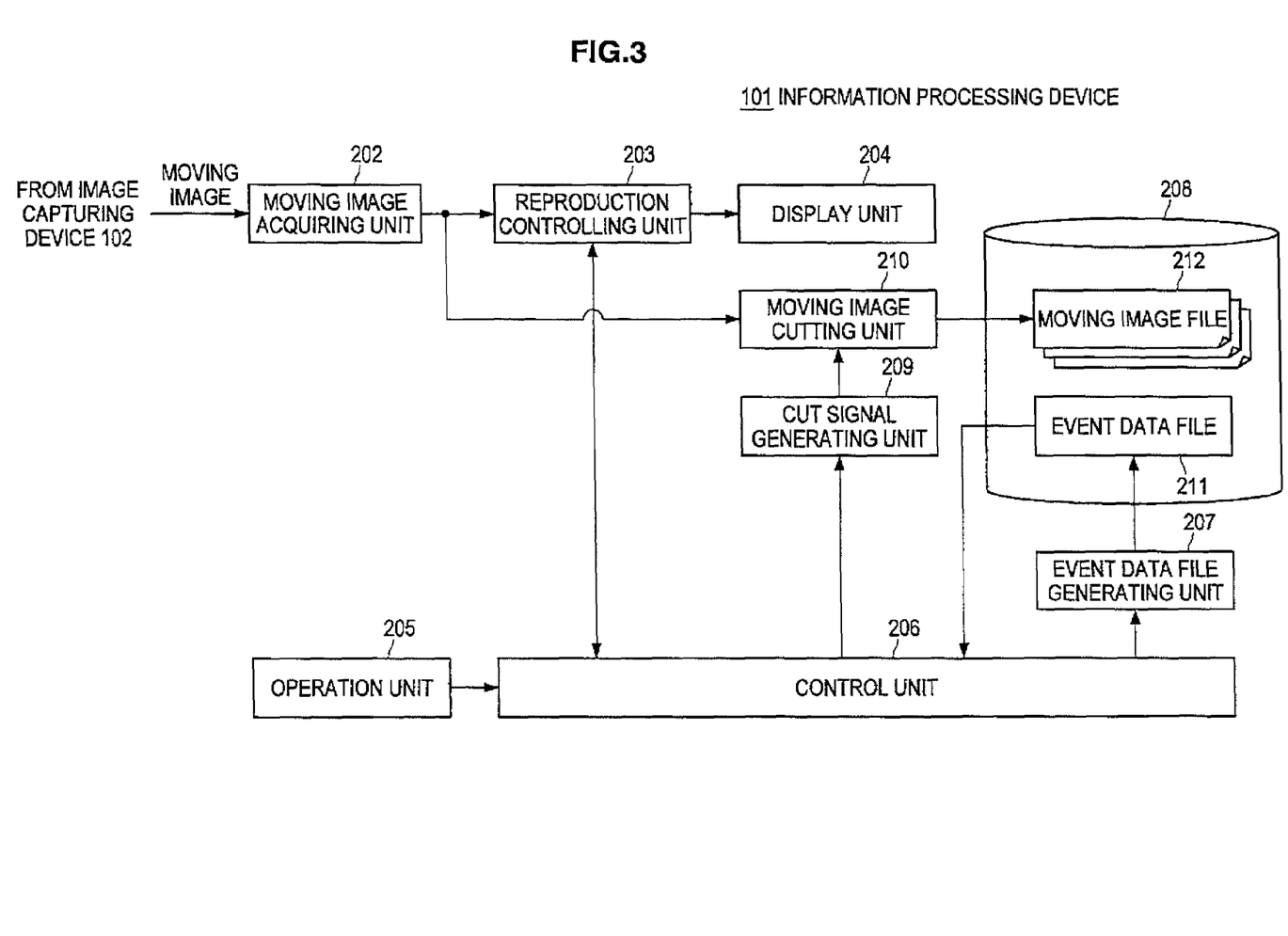
FIG. 3 is a block diagram showing the image processing device according to an embodiment of the present invention.

FIG. 3 is the information processing device 101 showing an embodiment of the present invention.

The information processing device 101 includes a moving image acquiring unit 202, a reproduction controlling unit 203, a display unit 204, and an operation unit 205. The information processing device 101 further includes a control unit 206, an event data file generating unit 207, a nonvolatile storage unit 208, a cut signal generating unit 209, and a moving image cutting unit 210.

The moving image capturing unit 202 is what is known as an interface, which acquires a moving image currently captured by the image capturing device 102, and outputs the acquired moving image to the reproduction controlling unit 203 and the moving image cutting unit 210.

The display unit 204 is, for example, a display. The display unit 204 displays the moving image input from the moving image acquiring unit 202, that is, the moving image currently captured by the image capturing device 102, on the basis of control of the reproduction controlling unit 203.

The reproduction controlling unit 203 controls an operation of reproducing or stopping the moving image displayed on the display unit 204. The reproduction controlling unit 203 also outputs information indicating how many frames have been used before a frame of the moving image currently being displayed on the display unit 204 (hereinafter, referred to as "frame information") to the control unit 206. The reproduction and stop are performed on the basis of operation of the user 103 to the operation unit 205. The operation unit 205 is a keyboard, a pointing device, and the like, and outputs a predetermined instruction to the control unit 206 according to content operated by the user 103.

On the other hand, the event data file generating unit 207 generates/updates an event data file 211 of a predetermined format. The event data file 211 is generated/updated on the basis of event data input by the user 103 from the operation unit 205, time information acquired from a clock (not shown), and frame information input from the moving image controlling unit 203. The event data is data indicating an action of a player such as a "shot," a "free kick," a "corner kick," a "dribble," or a "goal." The time information acquired from the clock is, for example, coordinated universal time (UTC), but is not limited to UTC.

The control unit 206 controls each block constituting the information processing device 101. The control unit 206 reads event data stored in the nonvolatile storage unit 208. The control unit 206 controls the cut signal generating unit 209 on the basis of recently input event data, that is, content of a part recently updated in the event data file 211 (hereinafter, referred to as "recent event data").

The cut signal generating unit 209 generates a cut signal on the basis of control of the control unit 206, and outputs the cut signal to the moving image cutting unit 210 at a predetermined timing.

The moving image cutting unit 210 cuts the moving image input from the moving image acquiring unit 202 in a predetermined range on the basis of the cut signal input from the cut signal generating unit 209. The cut moving image is stored in the nonvolatile storage unit 208 as a moving image file 212.

The nonvolatile storage unit 208 is, for example, a hard disk. The event data file and the moving image file 212 are stored in the nonvolatile storage unit 208.

The event data file 211 is a file in which the event data, the time information, and the frame information are associated. However, actual event data includes position information of each player and the like as well as those described above, but the position information of the player or the like is omitted since the position information is not used in this example.

The moving image file 212 is in an editable state by filing a cut moving image until imaging by the image capturing device 102 ends. The number of moving image files 212 to be generated is the same as the number of cuts.

[Operation of Information Processing Device 101]

Next, processing of generating the moving image file 212 of the information processing device 101 (hereinafter, referred to as "moving image file generation processing") will be described with reference to FIG. 4.

Figure 4:
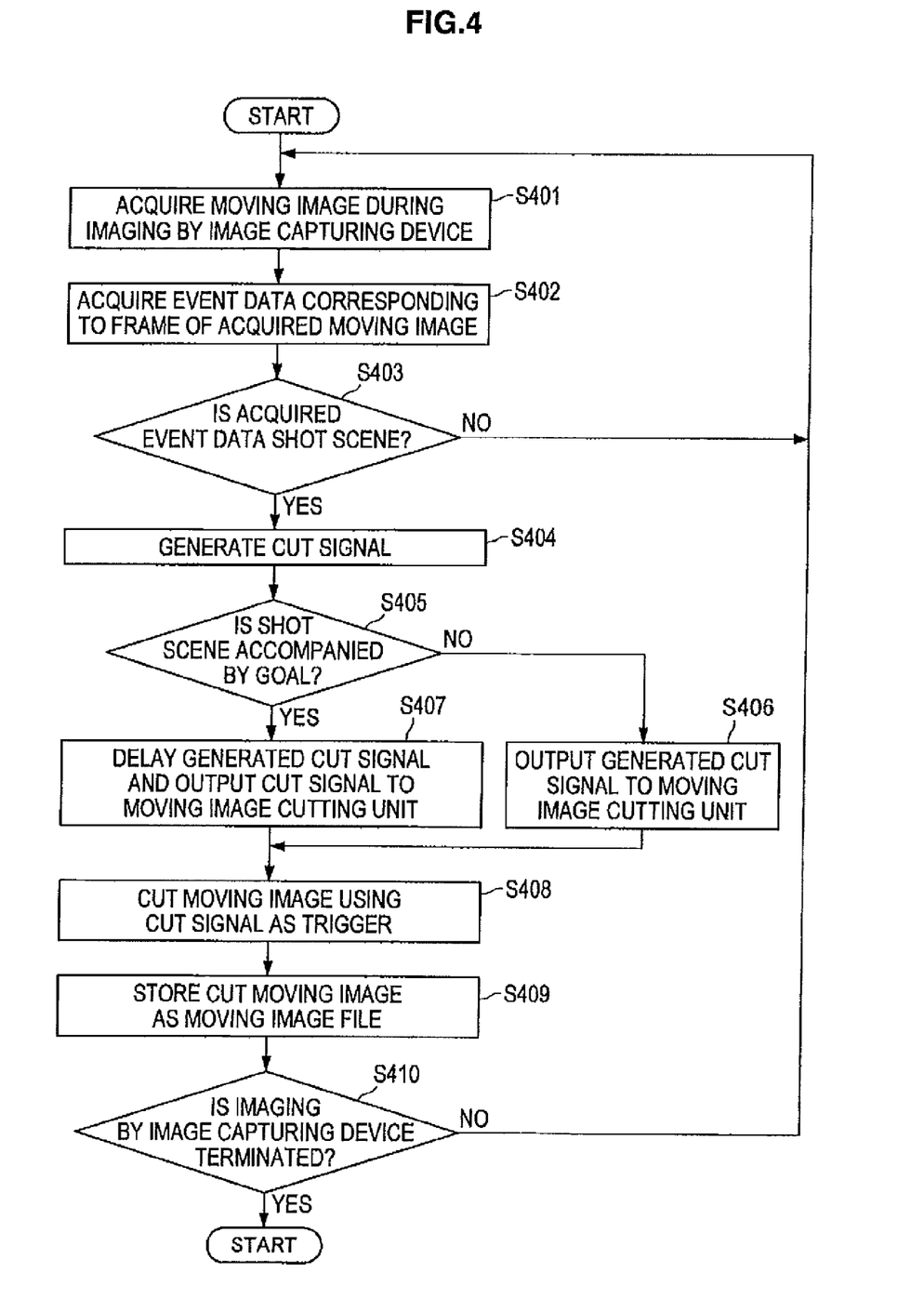
FIG. 4 is a flowchart showing an operation of the information processing device according to an embodiment of the present invention.

FIG. 4 is a flowchart showing a flow of moving image file generation processing.

A moving image (see FIG. 2) of soccer imaged by the image capturing device 102 is input to the moving image acquiring unit 202.

First, the moving image acquiring unit 202 acquires a moving image of soccer input from the image capturing device 102 (step S401). The moving image of soccer is output to the reproduction controlling unit 203 and the moving image cutting unit 210, respectively.

The reproduction controlling unit 203 causes the display unit 204 to reproduce and display the moving image of soccer input from the moving image acquiring unit 202. At this time, in the reproduction controlling unit 203, frame information corresponding to the moving image of soccer currently displayed on the display unit is output to the event data file generating unit 207 via the control unit 206.

The user 103 inputs event data to the operation unit 205 while checking the moving image of soccer displayed on the display unit 204. Then, the input event data is output to the event data file generating unit 207 via the control unit 206.

The event data file generating unit 207 generates the event data file 211 in which the event data input from the operation unit 205, the time information input from the clock (not shown), and the frame information input from the reproduction controlling unit 203 are associated, and stores the event data file 211 in the nonvolatile storage unit 208. If the event data file 211 has already been stored within the nonvolatile storage unit 208, the event data file 211 is updated by additionally writing the event data, the frame information, and the time information in a predetermined position of the event data file 211.

After the above-described processing is completed, the event data file 211 stored in the nonvolatile storage unit 208 is acquired in the control unit 206. It is checked whether or not recent event data of the event data file 211, that is, last event data input by the user 103 to the operation unit 205, is a shot scene (step S403). If the recent event data is not a shot scene (NO of step S403), the processing is repeated by returning to step S401.

If the recent event data is a shot scene (YES of step S403), the control unit 206 controls the cut signal generating unit 209 to generate a cut signal. The cut signal generating unit 209 generates the cut signal (S404).

Subsequently, the control unit 206 checks whether or not the shot scene checked in the processing of YES of step S403 is a shot scene accompanied by a goal (step S405).

If the shot scene is not accompanied by a goal (NO of step S405), the control unit 206 causes the cut signal generating unit 209 to output a cut signal to the moving image cutting unit 210 at a point in time of time information corresponding to the recent event data (step S406). Instead of the time information, it is possible to use the frame information corresponding to the recent event data. In this case, it is preferable to output the cut signal to the moving image cutting unit 210 at a point in time corresponding to the frame information.

On the other hand, if the shot scene is accompanied by a goal (YES of step S405), the cut signal generating unit 209 outputs the cut signal to the moving image cutting unit 210 by delaying it by a predetermined time from the point in time of time information corresponding to the recent event data (step S407). Instead of the time information, it is possible to use frame information corresponding to the recent event data. In this case, it is preferable to output the cut signal to the moving image cutting unit 210 at a point in time after a predetermined frame from the point in time of the frame information.

In the moving image cutting unit 210, the moving image input from the moving image acquiring unit 202 is cut at a point in time when the cut signal has been input from the cut signal generating unit 209 (step S408). The cut moving image is stored in the nonvolatile storage unit 208 as the moving image file 212 (step S409).

In the control unit 206, it is determined whether or not the image capturing device 102 still performs imaging, that is, whether a moving image is input from the moving image acquiring unit 202 (step S410). If the moving image is input from the moving image acquiring unit 202 (NO of step S410), the processing is repeated by returning to step S401. If the moving image is not input from the moving image acquiring unit 202 (YES of step S410), the processing ends.

In the present invention as described above, a position where the moving image is cut during imaging is appropriately decided using event data to be recorded during a soccer match. Thereby, it is possible to sequentially generate a moving image file by sequentially cutting the moving image in an appropriate position while capturing the moving image. Thereby, a digest video is easily created by editing each cut moving image, and the efficiency of editing is also improved. The timing at which the cut signal is output from the cut signal generating unit is decided using the event data. Thereby, it is unnecessary to hire a person to decide the timing and it is possible to reduce the cost of labor.

The present invention can be used to cheaply build a mechanism for editing a moving image while performing imaging since the above-described configuration is simple.

In the present invention, the timing at which the cut signal is output from the cut signal generating unit according to a type of event is delayed. Thereby, for example, it is possible to generate a moving image file so that a celebratory scene is included when there is the goal.

[Correspondence Relationship]

One embodiment has been described above. Finally, an example of a hardware configuration of the information processing device 101 will be described with reference to FIG. 5. First, a correspondence relationship between the same hardware configuration and the above-described functional configuration will be described.

Figure 5:
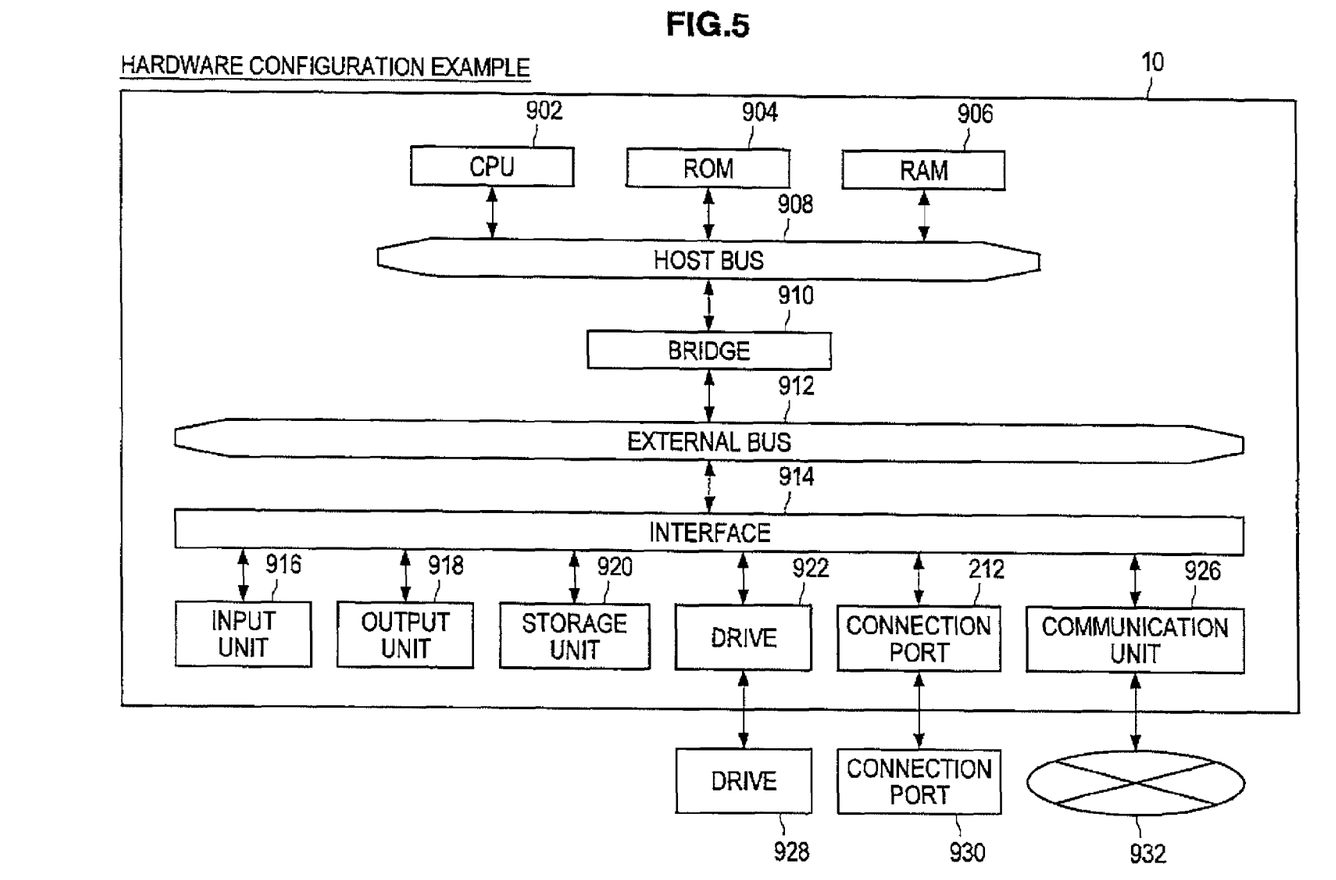
FIG. 5 is an illustrative diagram showing a hardware configuration of the image processing device according to an embodiment of the present invention.

Functions of the moving image acquiring unit 202, the reproduction controlling unit 203, and the control unit 206 are implemented by a central processing unit (CPU) 902 on the basis of a program recorded on a read only memory (ROM) 904, a random access memory (RAM) 906, a storage unit 920, or a removable recording medium 928. Functions of the event data file generating unit 207, the cut signal generating unit 209, and the moving image cutting unit 210 are also implemented by the CPU 902 on the basis of the same program. A function of the nonvolatile storage unit 208 is implemented by the RAM 906, the storage unit 920, or the removable recording medium 928. A function of the display unit 204 is implemented by an output unit 918. However, if the display unit 204 has a function as an input means such as a touch panel, the display unit 204 also corresponds to the operation unit 205.

[Hardware Configuration (Information Processing Device 101)]

The function of each component provided in the above-described device can be implemented, for example, by the information processing device 101 having the hardware configuration shown in FIG. 5 using a computer program to implement the above-described functions. FIG. 5 is an illustrative diagram showing the hardware configuration of the information processing device 101 capable of implementing the function provided in each component of the above-described device. The form of the information processing device 101 is arbitrary, and, for example, includes a portable information terminal such as a PC, a mobile phone, or a personal digital assistant (PDA), a game machine, or various home information appliances.

As shown in FIG. 5, the information processing device 101 mainly includes the CPU 902, the ROM 904, and the RAM 906. The information processing device 101 further includes a host bus 908, a bridge 910, an external bus 912, an interface 914, an input unit 916, the output unit 918, the storage unit 920, a drive 922, a connection port 924, and a communication unit 926.

The CPU 902 functions as, for example, an arithmetic processing unit or a control unit, and controls the overall operation of each component or part thereof on the basis of various programs recorded on the ROM 904, the RAM 906, the storage unit 920, or the removable recording medium 928. The ROM 904 stores, for example, a program to be read to the CPU 902, data to be used for computations, and the like. The RAM 906 temporarily or permanently stores, for example, a program to be read to the CPU 902, various parameters to be appropriately changed when the program is executed, and the like. These components are interconnected with each other, for example, via the host bus 908 capable of high-speed data transmission. The host bus 908 is connected, for example, via the bridge 910, to the external bus 912 in which a data transmission speed is comparatively low.

The input unit 916 is an operating means such as, for example, a mouse, a keyboard, a touch panel, buttons, switches, and a lever. The input unit 916 may be a remote control means (known as remote control) capable of transmitting a control signal using infrared or other radio waves. The input unit 916 is constituted by, for example, an input control circuit for transmitting, as an input signal, information input using the operating means, to the CPU 902.

The output unit 918 is, for example, a device capable of visually or audibly notifying the user of acquired information. For example, the output unit 918 is a display device such as a cathode ray tube (CRT), a liquid-crystal display (LCD), or a plasma display panel (PDP).

The storage unit 920 is a device for storing various data, and is constituted by a magnetic storage device such as a hard disk drive (HDD), a semiconductor storage device, an optical storage device, or a magneto-optical storage device.

The drive 922 is, for example, a device that reads information recorded on the removable recording medium 928, such as a magnetic disk, an optical disc, a magneto-optical disc, or a semiconductor memory, and writes information to the removable recording medium 928. For example, the removable recording medium 928 is a DVD medium, Blu-ray medium, an HD DVD medium, a compact flash (CF) (registered trademark), a memory stick, or the like. Of course, the removable recording medium 928 may be an integrated circuit (IC) card in which a non-contact IC chip is installed, or an electronic device.

The connection port 924 is a port for connecting an external connection device 930, and is, for example, a USB port, an IEEE 1394 port, a small computer system interface (SCSI) port, or an RS-232C port. For example, the external connection device 930 is a printer, a portable music player, a digital camera, a digital video camera, or an IC recorder.

The communication unit 926 is a communication device for connecting to a network 932. For example, the communication unit 926 is a communication card for a wired or wireless local area network (LAN), Bluetooth (registered trademark), or a wireless USB (WUSB), a modem for various communication, or the like. The network 932 connected to the communication unit 926 is constituted by a network connected in a wired or wireless mode, and, for example, is the Internet, a household LAN, infrared communication, visible light communication, broadcasting, satellite communication, or the like.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above-described embodiment, the control unit controls the cut signal generating unit to output a cut signal to the moving image cutting unit if recent event data satisfies a predetermined condition. However, the control unit may control the cut signal generating unit to output a cut signal to the moving image cutting unit in a predetermined cycle even when the recent event data satisfies the predetermined condition. Thereby, since the generated moving image file is further divided, an operation of editing the moving image file for creating a digest video is more easily and efficiently performed.

In the above-described embodiment, the control unit causes the cut signal generating unit to generate a cut signal when the recent event data is a "shot." However, the control unit can cause the cut signal generating unit to generate the cut signal even when the recent event data is something other than a "shot." At this time, the control unit may decide the timing at which the cut signal is output from the cut signal generating unit to the moving image cutting unit on the basis of a type of recent event data. Thereby, a moving image of a range corresponding to a type of event can be cut from a currently captured moving image.

The function of the above-described information processing device 101 is implemented by any electronic device of a television receiver, a recording/reproducing device, a game machine, a portable information terminal, a mobile phone, a home appliance, or the like.

The invention claimed is:

1. An information processing device comprising:
a moving image acquiring unit for acquiring a moving image during imaging;
an event acquiring unit for acquiring event data that is information indicating a scene of each frame of the moving image acquired by the moving image acquiring unit;
a cut signal generating unit for generating a cut signal if the event data acquired by the event acquiring unit satisfies a first predetermined condition;

a moving image cutting unit for cutting the moving image on the basis of the cut signal;

a storage unit for storing the moving image cut by the moving image cutting unit;

a control unit for deciding a timing at which the cut signal is output from the cut signal generating unit to the moving image cutting unit, in which when the event data acquired by the event acquiring unit satisfies the first predetermined condition, the control unit determines whether a second predetermined condition is satisfied, in which the second predetermined condition is different from the first predetermined condition, in which when the first predetermined condition is satisfied and the second predetermined condition is determined not to be satisfied, the control unit causes the cut signal generating unit to output the cut signal to the moving image cutting unit in accordance with frame information corresponding to the respective event data, in which when the first predetermined condition and the second predetermined condition are both satisfied, the control unit causes the cut signal generating unit to delay output of the cut signal to the moving image cutting unit by a predetermined amount from that corresponding to the frame information of the respective event data such that the cut signal is outputted after a predetermined frame from that corresponding to the frame information, and in which the first predetermined condition is a type of event and the second predetermined condition is a potential result of the type of the event.

2. The information processing device according to claim 1, in which the type of event of the first predetermined condition is an action of a player of a sporting event and the potential result is a potential result of the action of the player.

3. The information processing device according to claim 2, in which the sporting event is a soccer match, the action of the player is a shot on goal, and the potential result is a goal.

4. A moving image cutting method comprising the steps of:
acquiring a moving image during imaging;
acquiring event data that is information indicating a scene of each frame of the acquired moving image;
generating a cut signal, by use of a cut signal generating unit, if the acquired event data satisfies a first predetermined condition;
cutting the moving image, by use of a moving image cutting unit, on the basis of the cut signal;
storing the cut moving image in a storage medium; and
deciding a timing at which the cut signal is output from the cut signal generating unit to the moving image cutting unit,
in which when the acquired event data satisfies the first predetermined condition, the deciding step determines whether a second predetermined condition is satisfied, in which the second predetermined condition is different from the first predetermined condition,
in which when the first predetermined condition is satisfied and the second predetermined condition is determined not to be satisfied, the cut signal is caused to be output to the moving image cutting unit in accordance with frame information corresponding to the respective event data,
in which when the first predetermined condition and the second predetermined condition are both satisfied, the output of the cut signal to the moving image cutting unit is caused to be delayed by a predetermined amount from that corresponding to the frame information of the respective event data such that the cut signal is outputted after a predetermined frame from that corresponding to the frame information, and in which the first predetermined condition is a type of event and the second predetermined condition is a potential result of the type of the event.

5. The moving image cutting method according to claim 4, in which the type of event of the first predetermined condition is an action of a player of a sporting event and the potential result is a potential result of the action of the player.

6. The moving image cutting method according to claim 5, in which the sporting event is a soccer match, the action of the player is a shot on goal, and the potential result is a goal.

7. A non-transitory computer readable memory having stored therein a moving image cutting program for causing a computer to execute the processes of:
acquiring a moving image during imaging;
acquiring event data that is information indicating a scene of each frame of the acquired moving image;
generating a cut signal, by use of a cut signal generating unit, if the acquired event data satisfies a first predetermined condition;
cutting the moving image, by use of a moving image cutting unit, on the basis of the cut signal;
storing the cut moving image in a storage medium; and
deciding a timing at which the cut signal is output from the cut signal generating unit to the moving image cutting unit,
in which when the acquired event data satisfies the first predetermined condition, the deciding step determines whether a second predetermined condition is satisfied, in which the second predetermined condition is different from the first predetermined condition,
in which when the first predetermined condition is satisfied and the second predetermined condition is determined not to be satisfied, the cut signal is caused to be output to the moving image cutting unit in accordance with frame information corresponding to the respective event data,
in which when the first predetermined condition and the second predetermined condition are both satisfied, the output of the cut signal to the moving image cutting unit is caused to be delayed by a predetermined amount from that corresponding to the frame information of the respective event data such that the cut signal is outputted after a predetermined frame from that corresponding to the frame information, and in which the first predetermined condition is a type of event and the second predetermined condition is a potential result of the type of the event.

8. The non-transitory computer readable memory according to claim 7, in which the type of event of the first predetermined condition is an action of a player of a sporting event and the potential result is a potential result of the action of the player.

9. The non-transitory computer readable memory according to claim 8, in which the sporting event is a soccer match, the action of the player is a shot on goal, and the potential result is a goal.

* * * * *